(12) United States Patent
Schorr, III et al.

(10) Patent No.: US 8,129,620 B2
(45) Date of Patent: Mar. 6, 2012

(54) DECORATIVE CORDS AND CABLES

(76) Inventors: Jerome Otto Schorr, III, Bel Air, MD (US); Anitra Kareen Schorr, Bel Air, MD (US)

(*) Notice: Subject to any disclaimer, the term of this patent is extended or adjusted under 35 U.S.C. 154(b) by 392 days.

(21) Appl. No.: 12/386,903

(22) Filed: Apr. 24, 2009

(65) Prior Publication Data

US 2009/0266581 A1 Oct. 29, 2009

Related U.S. Application Data

(60) Provisional application No. 61/125,492, filed on Apr. 25, 2008.

(51) Int. Cl.
*H01B 7/00* (2006.01)

(52) U.S. Cl. .................. 174/110 R; 174/112

(58) Field of Classification Search .............. 174/110 R, 174/112, 135
See application file for complete search history.

(56) References Cited

U.S. PATENT DOCUMENTS

| | | | |
|---|---|---|---|
| 2,896,352 A * | 7/1959 | Marlo | 428/21 |
| 4,454,374 A | 6/1984 | Pollack | |
| 4,737,129 A | 4/1988 | Gorley | |
| 4,826,112 A | 5/1989 | Rettler | |
| 5,130,496 A * | 7/1992 | Jenkins | 174/135 |
| 5,397,243 A * | 3/1995 | MacMurdo, Sr. | 439/136 |
| 5,895,288 A * | 4/1999 | Nelson | 439/502 |
| D455,093 S * | 4/2002 | Fitzgerald | D10/98 |
| 6,595,658 B2 * | 7/2003 | Tsai | 362/227 |
| D296,332 S | 5/2008 | Young, IV | |
| 7,807,928 B1 * | 10/2010 | Tate | 174/110 R |

* cited by examiner

*Primary Examiner* — William Mayo, III
(74) *Attorney, Agent, or Firm* — Ober, Kaler, Grimes & Shriver; Royal W. Craig

(57) ABSTRACT

A cord and/or cable structure for electrical cords, extension cords, communication cables or other cords and cables in which an outer insulating sheath is formed with multiple integral anchoring fixtures for affixing decorative elements, such as artificial leaves, to give a pleasing natural vine aesthetic to the cord and/or cable. The anchoring fixtures allow removal and attachment of other decorative elements so that the vine-look can be easily modified to suit a wide variety of tastes.

12 Claims, 5 Drawing Sheets

DECORATIVE CORDS AND CABLES

CROSS-REFERENCE TO RELATED APPLICATION(S)

The present application derives priority from U.S. provisional application Ser. No. 61/125,492 filed 25 Apr. 2008.

BACKGROUND OF THE INVENTION

1. Field of the Invention

The present invention relates to electrical cords and cables configured to provide a decorative aesthetic and, more particularly, to a cord and/or cable structure by which decorative elements such as leaves may be secured to convey a decorative aesthetic such as the appearance of vines.

2. Description of the Background

Electrical cords and cables are well-known commodities and their construction is governed by various organizational standards, depending on their intended applications. For example, extension cords are widely held to Underwriters Laboratories, Inc. standards. The UL is an independent product safety certification organization that has been testing products and writing standards for more than 100 years (see UL 817). In addition, the Uniform Fire Code (UFC) implements relevant standards (UFC: Article 85) as does the Occupational Safety and Health Organization (OSHA).

Since cables and cords (including extension cords) must typically extend from device to outlet (or device to device), aesthetics can be a significant issue for many consumers. Conventional cords can be fairly unsightly, and there have been many efforts to make cords more aesthetically pleasing. However, any departure from familiar structural configurations may jeopardize compliance with the appropriate regulatory standards as identified above. Consequently, most commercially viable efforts have focused on cord covers that preserve the integrity of the cord. For example, known prior art aesthetic electrical cord covers include U.S. Pat. No. 5,130,496; U.S. Pat. No. 5,397,243; U.S. Pat. Des. 296,332; U.S. Pat. No. 4,454,374; U.S. Pat. No. 4,826,112 and U.S. Pat. No. 4,737,129.

One example of a more aesthetically pleasing configuration is set forth in U.S. Pat. No. 5,895,288 to Nelson issued Apr. 20, 1999, which discloses a simulated plant power line for making cords of all types appear as a growing plant. The cord itself may have a plurality of simulated leaves extending outwardly from the body, or may be a removable cover with leaves that serves as a sheath for an existing electric cord. With either option, the simulated leaves are integrally formed to the cord insulation or sheath. While these devices may fulfill their aesthetic objectives, it is practically difficult to manufacture. Protruding leaves cannot be economically molded to an elongate cord, or adhered.

Thus it would be greatly advantageous to provide a decorative cord including an insulating jacket with multiple anchoring fixtures that provide a point of connection between the cord or cable and the multiple decorative elements that will adorn it. This will allow separate manufacture of the cord pursuant to all applicable standards, and manufacture of the decorative elements which can then be securely attached to the cord insulation or sheath to enhance the aesthetics of the finished product. Examples of decorative elements include, but are not limited to, artificial leaves, artificial flowers, balloons, bulbs, artificial fruit, artificial vegetables, figures, etc. These decorative elements may be permanent, semi-permanent, or detachable/re-attachable decorations.

SUMMARY OF THE INVENTION

It is an object of the present invention to provide a more aesthetically pleasing cord or cable in a commercially viable configuration.

It is another object to provide a decorative cord including an insulating sheath formed with multiple integral anchoring fixtures that provide a point of connection between the cord or cable and the multiple decorative elements that adorn it.

It is still another object to provide a decorative cord that achieves an aesthetic as above and yet preserves the integrity and functional structure of the cord so as not to depart from established regulatory standards.

It is still another object to provide a decorative cord as above that allows separate manufacture of the cord versus the decorative elements that can then be securely attached to it to enhance the aesthetics of the finished product.

In accordance with the foregoing objects, the present invention is a cord and/or cable structure for electrical cords, extension cords, communication cables and other electrical power and/or signal carrying cords and cables. The cord structure comprises one or more central electrical conductors surrounded by one or more insulating sheaths, including an outmost sheath formed with multiple integral anchoring fixtures that provide a point of connection between the cord or cable and the multiple decorative elements that will adorn it. Examples of adorning elements are also disclosed and include, but are not limited to, artificial leaves, artificial flowers, balloons, bulbs, artificial fruit, artificial vegetables, figures, etc. These decorative elements may be permanent, semi-permanent, or detachable/re-attachable decorations.

In these respects, the decorative cord according to the present invention substantially departs from the limited concepts and designs of the prior art by providing new cords and cables that can be easily modified through the addition of decorative elements to make the end product aesthetically appealing to an extremely wide variety of audiences. Further, by providing a means to attach differing decorative elements, the present invention provides an economic advantage over the prior art, which is focused on providing a single type of decorative element. A consumer can use the present invention for multiple purposes or decorative variations instead of purchasing multiple decorative cords or cables as he would have to with the prior art.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a cord and/or cable structure for electrical cords, extension cords, communication cables and other electrical power and/or signal carrying cords and cables (collectively "cords") that includes one or more central electrical conductors surrounded by one or more insulating sheaths, including an outmost sheath formed with multiple integral anchoring fixtures that provide a point of connection between the cord or cable and the multiple decorative elements that will adorn it. Examples of adorning elements are also disclosed and include, but are not limited to, artificial leaves, artificial flowers, balloons, bulbs, artificial fruit, artificial vegetables, figures, etc. These decorative elements may be permanent, semi-permanent, or detachable/re-attachable decorations.

Figure 1:
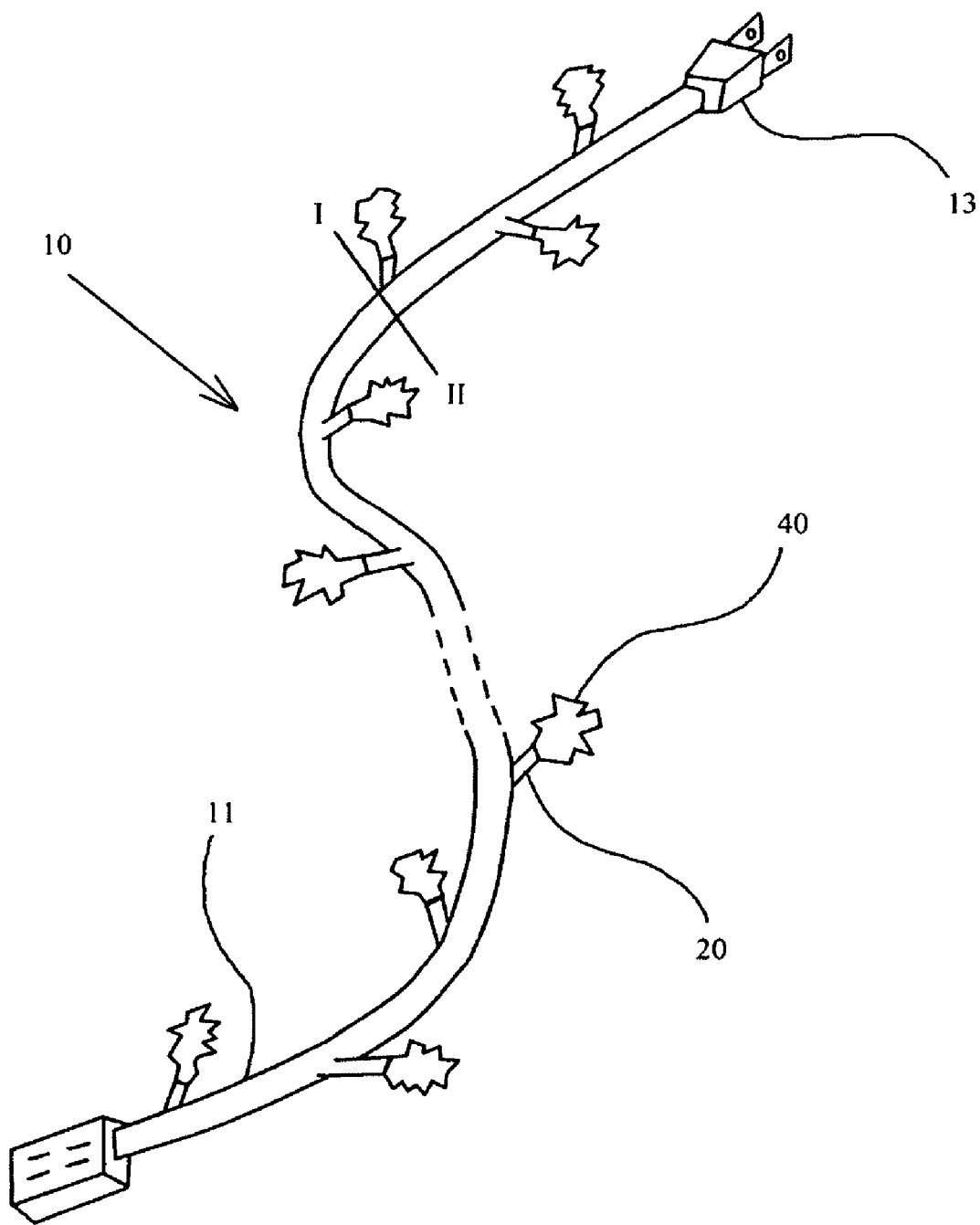
FIG. 1 shows a side elevation view of a decorative cord according to an exemplary embodiment of the present invention.

FIG. 1 shows a decorative cord 10 with multiple decorative artificial leaves 40 attached to and adorning it. Cord 10 generally comprises an elongated body formed with one or more internal conductors 1 (here obscured) covered by one or more individual insulating sheaths, and all covered by an outermost insulating sheath 11. Opposing plugs and/or receptacles such as plug 13 are provided, although male plug 13 is merely exemplary. Alternatives to plug 13 may include, but are not limited to, specific connectors associated with electric cables, audio cables, video cables, USB cables, data cables, coaxial cables, fiber optic cables, telecommunication cables, extension cords, electrical power cords, cords fitted with power strips, etc.

The outermost insulating sheath 11 is formed with a plurality of integral protrusions 20 extending at any angle outwardly there from. Protrusions 20 are preferably integrally molded exteriorly to the outermost insulating sheath 11 so as not to affect the internal integrity of the sheath or cord 10. However, the protrusions 20 may alternatively be separate parts that are permanently bonded to the exterior sheath 11 by means of adhesives, epoxy, hot glue, etc., or semi-permanently attached by means of clamps, ties, crimps, pinching, barbs, screw threads, etc. The protrusions may also be thermally bonded to or welded onto the exterior sheath 11.

The protrusions 20 serve as anchoring fixtures that provide a point of connection between the sheath 11 and the multiple decorative components 30 with associated decorative elements such as leaves 40 or other replica botanical appendages that adorn it. The use of anchoring fixtures such as protrusions 20 allows for separate manufacture of the cord pursuant to all applicable regulatory standards, versus manufacture of the decorative components 30 with associated decorative elements 40 which can be separately molded and then securely attached to the sheath 11. Moreover, this provides for unlimited customer-defined variation in the decorative elements 40 that are attached, as well as interchangeability to suit one's taste.

Figure 2:
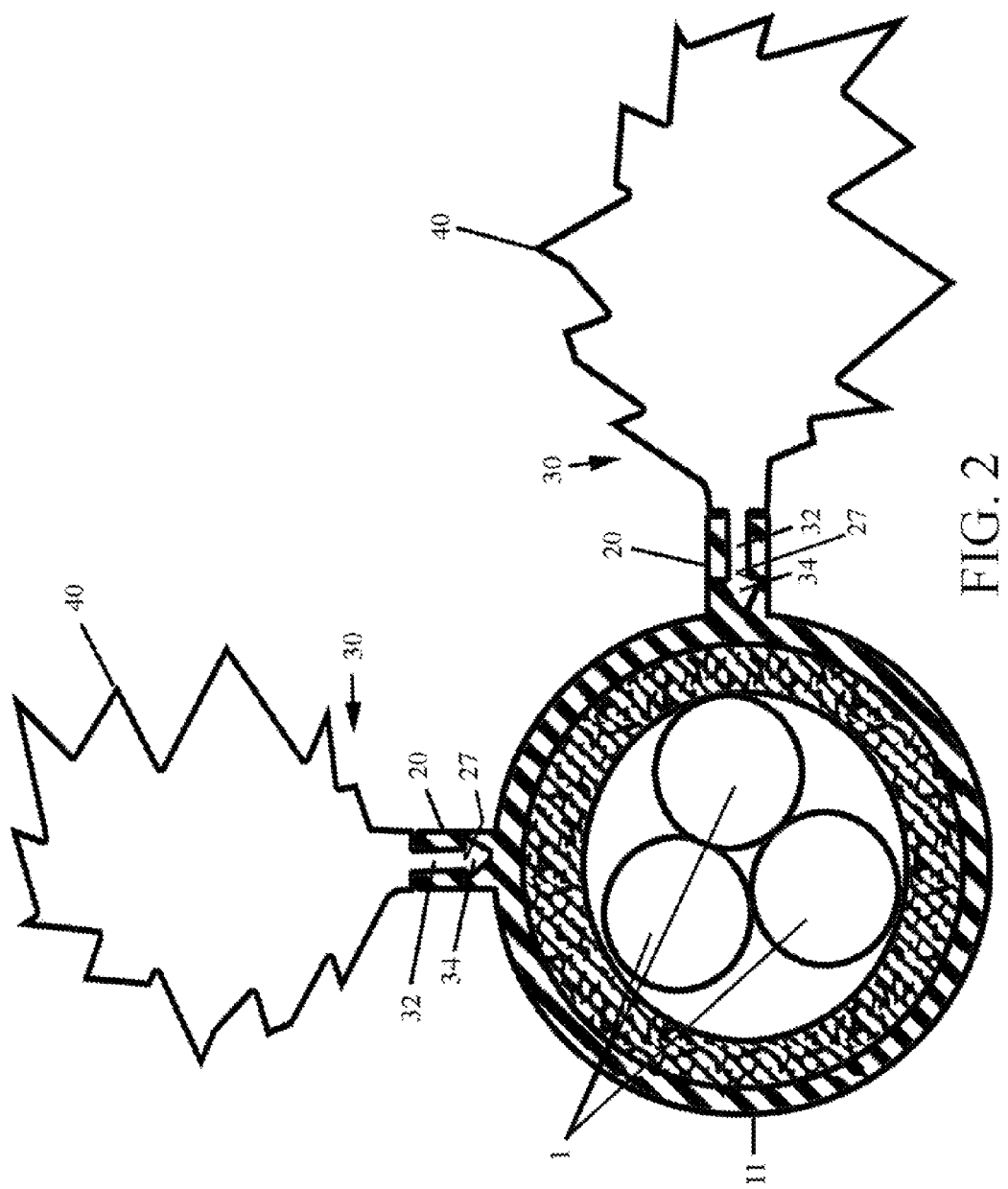
FIG. 2 shows a cross-sectional view along the line I-II of FIG. 1.

As seen in FIG. 2, an exemplary cross-section of a protrusion 20 is shown along with the conforming structure of a decorative component 30. Here each protrusion 20 comprises a hollow cylindrical ferrule, open outward, and leading inward along a smooth interior surface to a step 27 of slightly increased diameter occurring along its length. The connected decorative components 30 including the decorative elements 40 (here artificial leaves) are formed with a short stem 32 leading to a flared conical head 34 defining a rearwardly-facing flange. The stem 32 of each decorative component 30 is inserted into the hollow of a protrusion 20 and is press-fit therein until the conical head 34 submerges beneath the increased diameter step of the protrusion 20. The rearward flange of head 34 becomes trapped against the step to lock the decorative component 30 in place, effectively anchoring it to the outer sheath 11. One skilled in the art will readily understand that the cooperating protrusions 20 and stems 32 of each decorative component 30 may be formed in alternate configurations without departing from the scope or spirit of the present invention. For example, each protrusion 20 may comprise a flared conical head and each stem 32 of the connected decorative components 30 may comprise the hollow cylindrical ferrule. Alternately, the conical head 34 may not be necessary and a simple press-fit configuration may be better-suited to easier removal and interchangeability of the decorative components 30. Moreover, the stems 32 may be separate components that connect between the decorative components 30 and the protrusions 20. Virtually any configuration of interlocking connection will suffice.

Here the decorative leaves 40 are merely exemplary of the types of ornamentation that may be incorporated into the overall design of the finished cord 10 that will enhance the aesthetics of the finished product. Other examples of decorative elements 40 include, but are not limited to, artificial leaves, artificial flowers, balloons, bulbs, artificial fruit, artificial vegetables, figures, etc.

In the preferred embodiment of the present invention, the incorporated outermost insulating sheath 11 is preferably made of any strong durable and resilient material such as, for example, rubber or any type of suitable plastic. The sheath 11 color and/or texture may be modified as desired to properly accentuate the connected components 30 and decorative elements 40 that are attached to the protrusions 20. The plug(s) 13 at the ends of the cord 10 may also be color and/or texture-modified to properly accentuate the connected components 30 and decorative elements 40 that are attached to the protrusions 20. If desired, the sheath 11 may be sectioned lengthwise for retrofit use as a cover to an existing cord.

Figure 3:
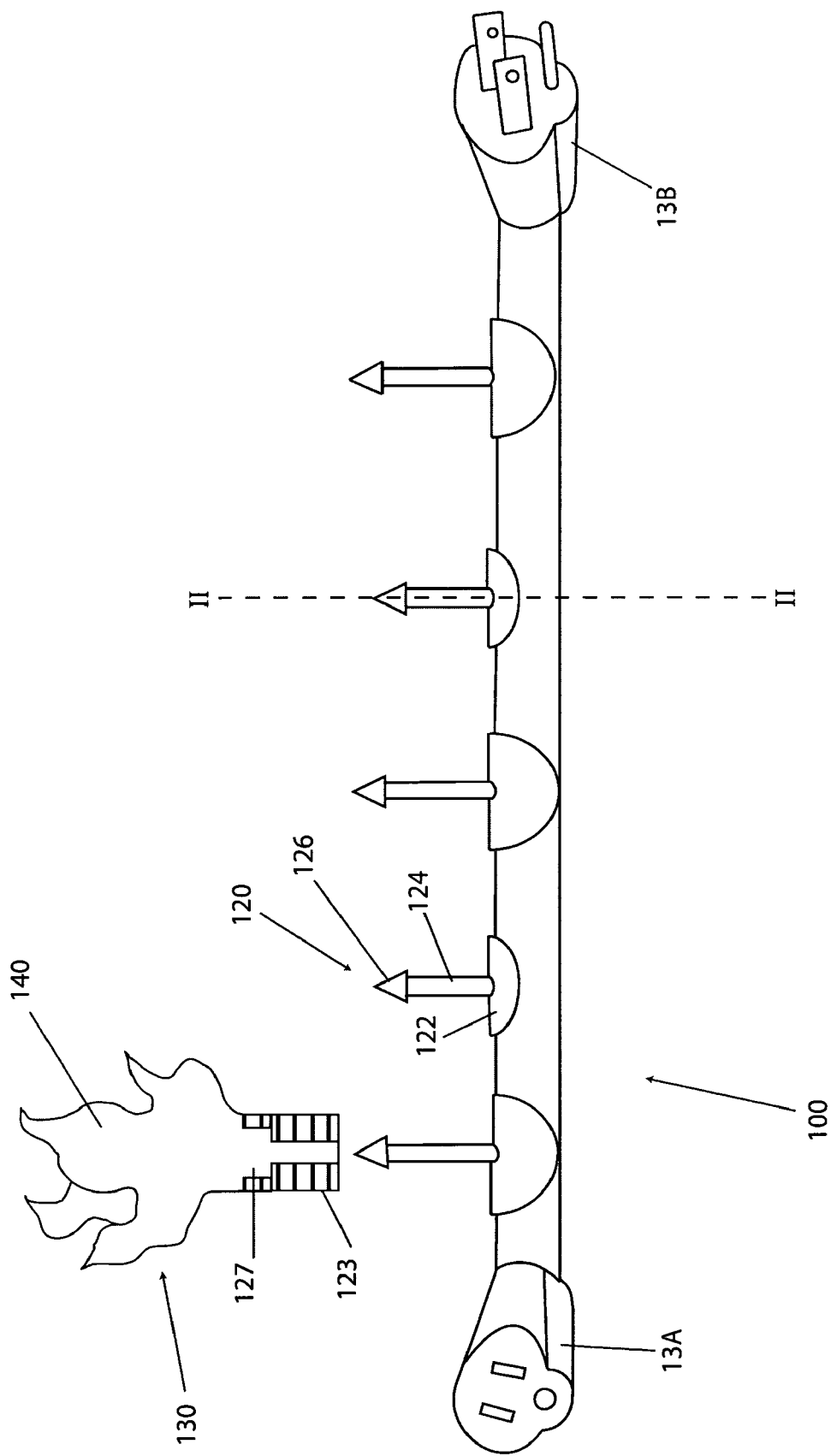
FIG. 3 shows a side elevation view of a decorative cord according to an alternative embodiment of the present invention.
Figure 4:
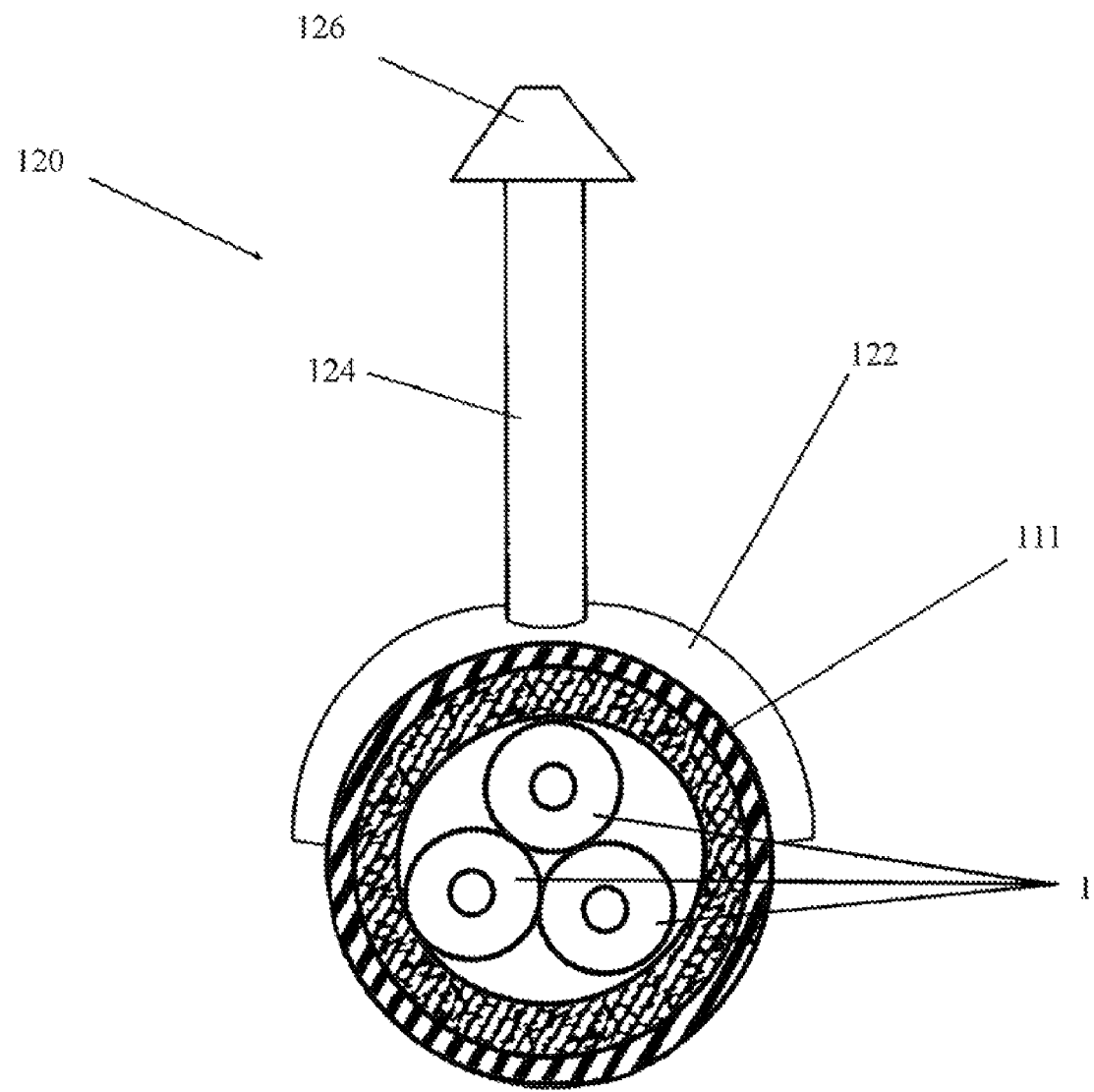
FIG. 4 shows a cross-sectional view along the line I-II of FIG. 3.

FIG. 3 shows a side elevation view of a decorative cord 100 according to an alternative embodiment of the present invention, again with multiple decorative ornaments such as artificial leaves 140 attached to and adorning it. FIG. 4 shows a cross-sectional view along the line I-II of FIG. 3. As before, cord 100 generally comprises an elongated body formed with one or more internal conductors 1 (here obscured) covered by one or more individual insulating sheaths, and all covered by an outermost insulating sheath 111. Opposing plugs 13B and/or receptacles 13A are provided. Alternatives to plug 13B and receptacle 13A may include, but are not limited to, specific connectors associated with electric cables, audio cables, video cables, USB cables, data cables, coaxial cables, fiber optic cables, telecommunication cables, extension cords, electrical power cords, cords fitted with power strips, etc.

Figure 5:
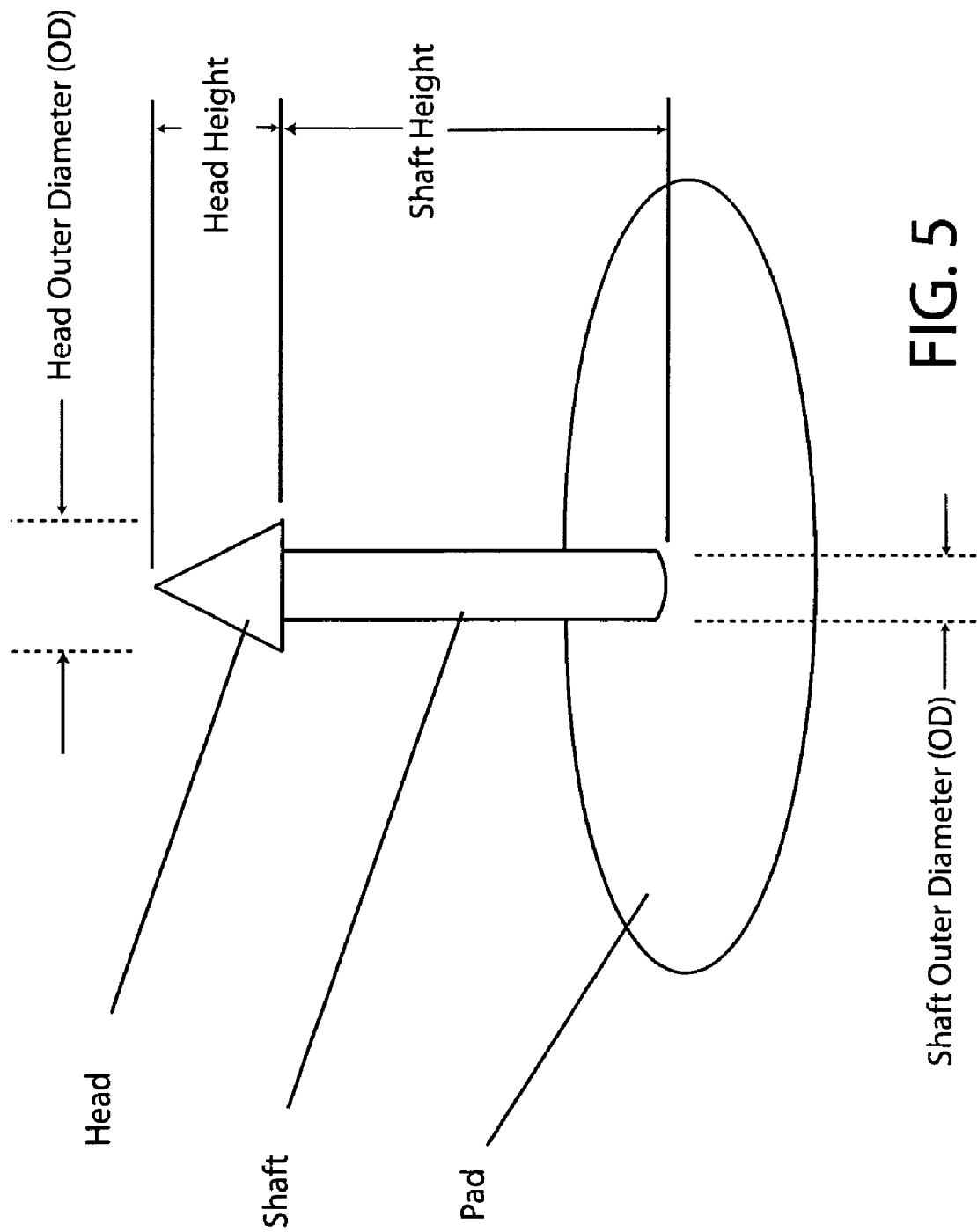
FIG. 5 shows an enlarged view of a protrusion attachment 120 as used in the embodiment of FIGS. 3-4.

FIG. 5 shows an enlarged view of a protrusion attachment 120 as used in the embodiment of FIGS. 3-4.

A plurality of integral protrusions 120 are adhered to the outermost insulating sheath 111. Each protrusion including a flexible base 122 for conforming to the tubular insulating sheath 111, and attached thereto by adhesive bonding or rubber welding (by epoxy, hot glue, thermal bonding or welding onto the exterior sheath 111). A stem 124 extends perpendicularly from the base 122. The integral protrusions 120 are preferably attached at uniform lengthwise increments along the sheath 111, but are angularly offset such that stems 124 extend at irregular angles outwardly there from. The protrusions 120 serve as anchoring fixtures that provide a point of connection between the sheath 111 and the multiple decorative components 130 with associated decorative elements such as leaves 140 or other replica botanical appendages that adorn it. The use of attached anchoring fixtures such as protrusions 120 allows for separate extrusion molding of the cord and sheath 111. Other examples of decorative elements 40 include, but are not limited to, artificial flowers, balloons, bulbs, artificial fruit, artificial vegetables, figures, etc., preferably made of flame retardant material.

As seen in FIG. 5, an exemplary protrusion 120 comprises the base 122 (preferably flat and round), and a cylindrical stem 124 leading outward to a bulbous, preferably frusto-conical head 126, all of which may be integrally molded. The presently preferred dimensions for each protrusion 120 are 2.22 mm stem 124 outer diameter, 4.75 mm stem 124 height (to head 126), 2.4 mm head 126 height, and a 2.5 mm head 126 outer diameter tapering to a tip, yielding a 7.15 mm total height. Referring back to FIG. 3, each stem 124 and head 126 anchors a corresponding decorative component 130, each decorative component including a receptacle 123 similar to that used on the protrusions 20 of FIGS. 1-2, e.g., a ferrule, open outward, and leading inward along a smooth interior surface to a step 127 of slightly increased diameter occurring along its length. The connected decorative components 130 including the decorative elements 140 (here artificial leaves) are connected to the stem 124 of protrusion 120 and are removably anchored in place by the flared conical head 126 abutting the step 127, effectively anchoring the decorative component 130 to the outer sheath 111. One skilled in the art will readily understand that the cooperating protrusions 120 and stems 124 as well as the receptacle of the decorative components 130 may be formed in alternate configurations without departing from the scope or spirit of the present invention. Virtually any configuration of interlocking connection will suffice. It is also possible to form the decorative element 130 with a base 122 and eliminate the stem 124 and interlocking connection, thereby allowing direct adhesion of the decorative elements 130 to the sheath 111.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. In all such cases the result is a more aesthetically pleasing cord or cable in a commercially manufacturable configuration that structures the aesthetics while preserving the integrity and functional structure of the cord so as not to depart from established regulatory standards.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

We claim:

1. A decorative cord or cable comprising:
   a plurality of internal conductors each covered by a corresponding plurality of inner insulating sheaths;
   an outermost insulating sheath covering all of said internal conductors and inner insulating sheaths, said outermost insulating sheath being molded;
   a plurality of protrusions each extending at an angle outwardly from said outermost insulating sheath, said protrusions being integrally molded to the outermost insulating sheath, each of said protrusions further comprising a cylindrical receptacle defined by a hollow interior opening outward;
   a plurality of decorative elements each defined by a stem adapted for insertion into the hollow of said protrusions.

2. The decorative cord or cable according to claim 1, wherein said protrusions are formed with a stepped inner surface.

3. The decorative cord or cable according to claim 2, wherein said stems are formed with a flared conical head for locking engagement with the stepped inner surface of said protrusions.

4. The decorative cord or cable according to claim 3, wherein said decorative elements include replica botanical appendages.

5. The decorative cord or cable according to claim 1, wherein said protrusions do not affect the internal integrity of the outermost sheath.

6. The decorative cord or cable according to claim 1, wherein said protrusions extend at multiple random angles outwardly from said body member.

7. A decorative cord or cable comprising:
   a plurality of internal conductors each covered by corresponding plurality of inner insulating sheaths;
   an outermost insulating sheath covering all of said internal conductors and inner insulating sheaths, said outermost insulating sheath being molded;
   a plurality of protrusions each extending at an angle outwardly from said outermost insulating sheath, said protrusions having a flexible base conforming to and attached to the outermost insulating sheath, a stem extending perpendicularly from said base, and an enlarged head at a distal end of said stem;
   a corresponding plurality of decorative elements each attachable to one of said protrusions, said decorative elements each including a receptacle opening outward for insertion of a stem, and an ornament attached to said receptacle.

8. The decorative cord or cable according to claim 7, wherein said enlarged head is frusto-conical.

9. The decorative cord or cable according to claim 7, wherein said receptacles are formed with a stepped inner surface.

10. The decorative cord or cable according to claim 9, wherein said enlarged head is frusto-conical for locking engagement with the stepped inner surface of said receptacles.

11. The decorative cord or cable according to claim 7, wherein said ornaments are replica botanical appendages.

12. The decorative cord or cable according to claim 7, wherein said protrusions extend at multiple random angles outwardly from said outermost insulating sheath.

* * * * *